United States Patent [19]

Grimmer

[11] 4,114,462

[45] Sep. 19, 1978

[54] UNBALANCED VIBRATOR FOR AN OSCILLATING CONVEYOR OR A VIBRATING SCREEN

[76] Inventor: Klaus Jürgen Grimmer, Alpenstrasse 39, Steiermark, A-8707 Leoben-Goss, Austria

[21] Appl. No.: 473,061

[22] Filed: May 24, 1974

Related U.S. Application Data

[62] Division of Ser. No. 258,986, Jun. 2, 1972, Pat. No. 3,822,604.

[51] Int. Cl.[2] .............................................. F16H 33/00

[52] U.S. Cl. .......................................... 74/61; 310/81; 310/166

[58] Field of Search ....................... 74/61; 310/81, 166

[56] References Cited

U.S. PATENT DOCUMENTS

| | | | |
|---|---|---|---|
| 2,989,869 | 6/1961 | Hanggi | 74/61 |
| 3,600,956 | 8/1971 | Boguth | 74/61 |

*Primary Examiner*—Benjamin W. Wyche
*Assistant Examiner*—Wesley S. Ratliff, Jr.
*Attorney, Agent, or Firm*—Hill, Gross, Simpson, Van Santen, Steadman, Chiara & Simpson

[57] ABSTRACT

Vibratory power unit for vibrating conveyers and screens comprising an asynchronous polyphase motor, at least one pair of associated unbalanced masses disposed on the shaft of said motor, with the first mass of a pair of said unbalanced masses being rigidly fastened to said shaft and with said second mass of said pair being movably arranged relative to said first mass, means for controlling and regulating the conveying rate during conveyer operation by varying the rotational speed of said motor between predetermined minimum and maximum values, said second mass being movably outwardly by centrifugal force against the pressure of spring means, said spring means being prestressed in such a manner that said second mass is, at rotational motor speeds lower than said minimum speed, held in its initial position, and at motor speeds between said lower and upper values in positions which are radially offset with respect to the axis of said motor to an extent depending on the value of said rotational motor speed.

7 Claims, 3 Drawing Figures

Figure 2:
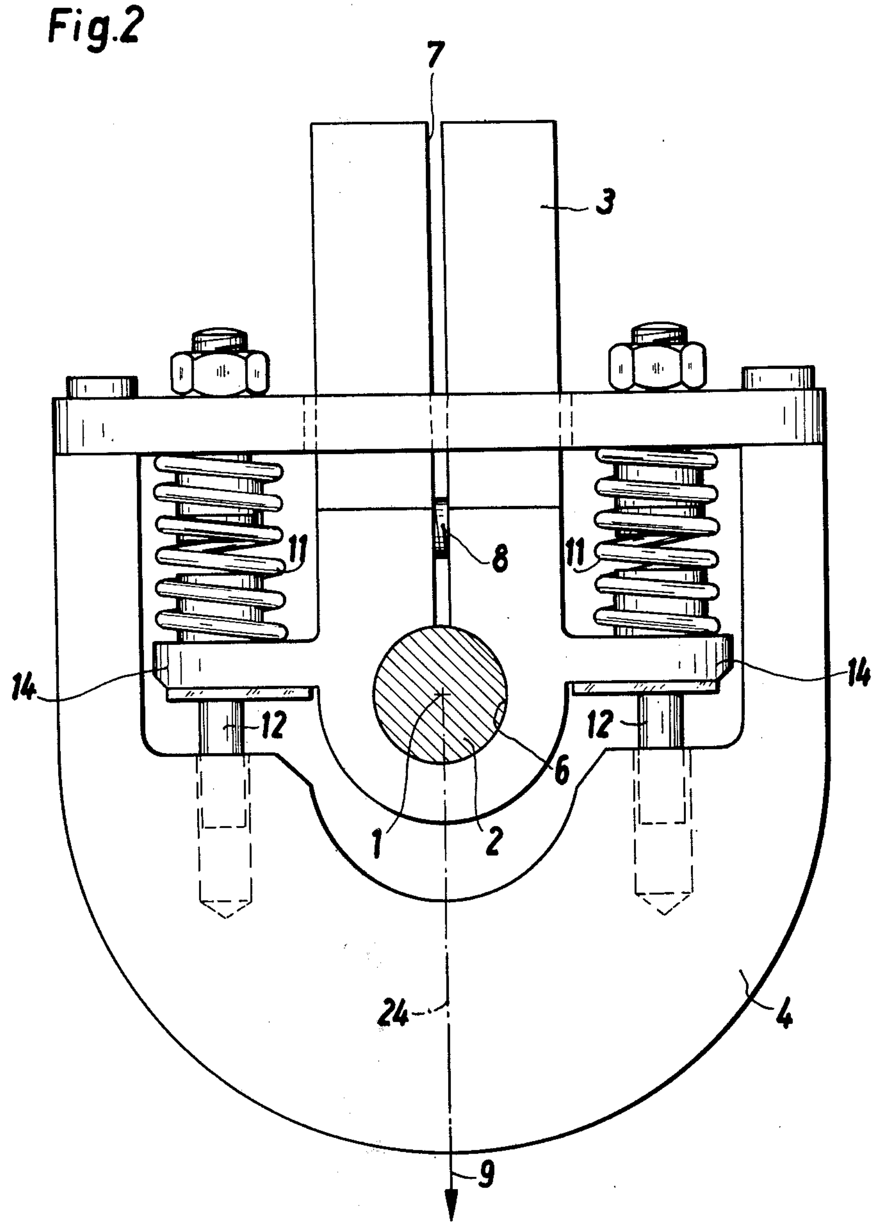

Fig.1
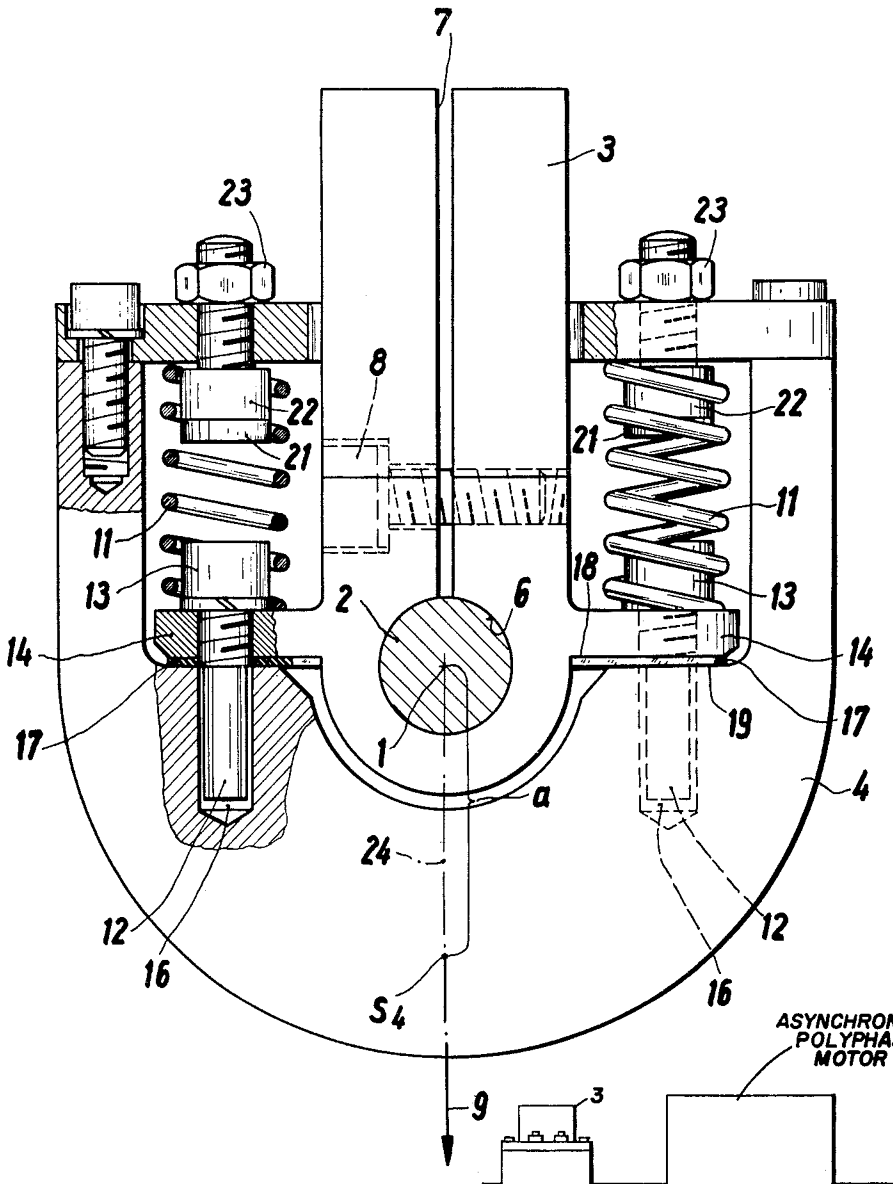
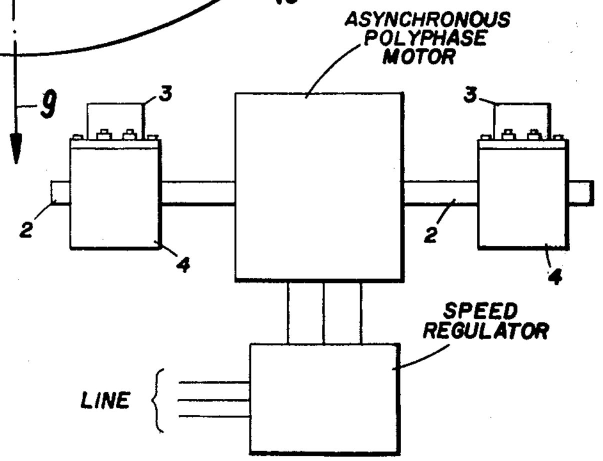
Fig.3

UNBALANCED VIBRATOR FOR AN OSCILLATING CONVEYOR OR A VIBRATING SCREEN

This is a division, of application Ser. No. 258,986, filed June 2, 1972, now U.S. Pat. No. 3,822,604.

The invention relates to an unbalanced vibrator for an oscillating conveyor or a vibrating screen connected in suitable manner to a conveyor or screen for imparting vibrations thereto, and pertains particularly to vibratory power units driven by an asynchronous polyphase motor and provided with at least one pair of associated unbalanced masses disposed on the shaft of said motor, with the first mass of a pair of said unbalanced masses being rigidly fastened to said shaft and with said second mass of said pair being movably arranged relative to said first mass.

Vibratory power units of this type are known, in which the position of the movable mass or weight member is changeable by rotating it relative to the fixed mass. In these power units a regulation of the centrifugal forces and, thus due to changes in the vibration amplitude, a regulation of the conveying capacity between a maximum and a minimum value can be obtained. Such regulation can, however, not be effected during operation but can be effected only when the unit is at rest. If the two masses of a pair or of each pair, if two pairs of masses are used, are of equal size, the conveying capacity can be adjusted between a maximum, when the two masses are directed equally with respect to the motor shaft, and zero, when the two masses are oppositely directed and the generated centrifugal forces cancel each other.

Although a power unit of this type brings a considerable advance over earlier power units with single masses, in which units the centrifugal forces could not be varied, it is unsuitable for applications in which the conveying capacity must be regulated during operation, for instance if the material has to be conveyed in such a manner that it can be dosed.

In cases where the conveying capacity must be varied during operation, it was therefore necessary to use so-called "unbalanced cells" driven by motors operated by direct current, which type of current is not available in most plants utilizing vibrating conveyers or screens.

There has also been used magnetic vibrating equipment, which can be easily regulated during operation. Electro-magnetic vibrators do only operate on 50 Hz or 100 Hz frequencies. Such high frequencies permit, due to the natural frequencies in bending, only limited lengths for the conveyers and screens on which the units are used. A further disadvantage is that at such high exciting frequencies the conveying speed and the conveying capacity is relatively low. Moreover electro-magnetic vibrating conveyers are noisy in operation and are also rather expensive.

It is an object of the invention to provide an inexpensive and simple vibratory power unit with a pair of relatively adjustable masses, which unit can be regulated and controlled during operation by varying the centrifugal forces between a maximum value and practically zero.

For solving this task a vibratory power unit for vibrating conveyers and screens comprises an asynchronous polyphase motor, at least one pair of associated unbalanced masses disposed on the shaft of said motor, with the first mass of a pair of said unbalanced masses being rigidly fastened to said shaft and with said second mass of said pair being movably arranged relative to said first mass, means for controlling and regulating the conveying rate during conveyer operation by varying the rotational speed of said motor between predetermined minimum and maximum values, said second mass being movably outwardly by centrifugal force against the pressure of spring means, said spring means being prestressed in such a manner that said second mass is, at rotational motor speeds lower than said minimum speed, held in its initial position, and at motor speeds between said lower and upper values in positions with are radially offset with respect to the axis of said motor to an extent depending on the value of said rotational motor speed.

The asynchronous polyphase motor is preferably a normal short circuit rotor motor i.e., an extraordinarily sturdy and yet inexpensive kind of motor. As control means for varying the rotational speed of this short circuit rotor motor there can for instance be used a controllable or regulatable compensating resistance or a transformer or a similar control means, by which the supply voltage of the motor can be reduced relative to its rated voltage in any desired manner. However, a reduction of the supply voltage below a value corresponding to about 80 - 85% of the rated motor speed is not desirable because the motor would stall, inasmuch as the torque produced by too low a voltage does not suffice anymore to overcome the forces resisting rotation. Whereas in known types of vibrating power units the small change in conveying rate or capacity resulting from such change of rotational speed is too small to be of practical interest for the operation of vibrating conveyers, this relatively low range of rotational speed available between rated speed and about 80 - 85% of rated speed is, if the unbalanced masses are arranged and prestressed by the spring means in accordance with the invention, fully sufficient for sensitively regulating the conveying capacity between a maximum value and practically zero. At a rotational speed of 80 - 85% of the rated speed, at which the torque produced by the motor, is still barely sufficient to overcome existing resistances — which speed has been referred to above as the minimum speed — the second mass is still in its "initial" position, which is the position it occupies when the unit is not operating. If the motor speed is increased above this minimum speed, the second mass will begin to move radially outwardly and it reaches its maximum distance from the first fixed mass resp. from the motor axis when the rated motor speed is reached.

If the conveying capacity is to be gradually changed during operation between the maximum value and practically zero, it is of advantage to have, when said second mass is disposed in its initial position, the center of gravity of the system, which comprises said first and second unbalanced masses and said spring means, located on the axis of the motor shaft. In this position the two masses of a pair are balanced with respect to the rotational axis of the motor. Thus no centrifugal forces are generated up to the time the lower limit of the control resp. regulating range has been reached and the vibration amplitude and therefore the conveying capacity is zero up to this lower limit.

The spring or resilient means comprise at least one spring and preferably four prestressed helical springs which are interposed between the two masses. The restoring force caused by the prestressing already exists when the unit is at rest and is, up to the time the minimum speed is reached, no large that the mass remains in its initial position. When the minimum speed limit of the regulating resp. controlling range is passed, the centrifugal force acting on the movable second mass will be of such magnitude that is surpasses the restoring force exerted by the prestressing of the springs, so that the second mass is lifted from the first mass.

It has been found to be of advantage to configurate the second mass symmetrically to the motor axis and symmetrically to the first mass, which is likewise configurated symmetrically to said axis, and, in addition, to provide guiding means for the second mass, so that the second mass when lifting off the first mass, can execute a predetermined movement. The second mass can for instance be guided on the free end of a pin the other end of which is rigidly fastened to the first mass. Preferably two such pins and for masses of relatively large width four such pins are provided. This construction is also expedient, because the fixed end of the pin resp. pins can simultaneously act as holding or centering means for the helical spring or springs.

In order to obtain always the same position for the second mass at any specific motor speed between minimum and rated speed, the system should be designed in such a way that radial movement of the center of gravity of the second mass is a function of the motor speed resp. of the corresponding angular velocity. To meet this condition at any specific motor speed within the regulation range, the overall spring constant c of the spring means is to be at least equal but preferably greater than the product of the mass m of the second unbalanced mass and the square of the angular velocity $\omega_N$ corresponding to the rated motor speed. For obtaining a defined position of the second mass relative to the first mass at any specific number of revolutions, the distance, which the center of gravity of the second mass has in the initial position thereof relative to the rotational axis of the motor, is unequal and preferably larger than the amount of linear prestressing of the spring means.

In the manner known for vibratory units of the type in which the centrifugal force is not adjustable during operation a vibratory unit according to the invention is preferably provided with two pairs of unbalanced masses arranged on the free ends of the motor shaft in overhung position.

If in an exceptional case the conveying capacity is not to be adjustable between the maximum value and zero, but between the maximum value and a value which is larger than zero, this condition can be met by shifting the center of gravity of the mass system comprising the second and first mass as well as the interconnecting spring means radially outwardly of the motor axis along the axis of symmetry of the masses, i.e., in a direction towards the second mass. In such an arrangement there can already be obtained at the prescribed minimum motor speed a centrifugal force of e.g. 80% of its maximum value, which — in view of the then larger effective regulation range — can be very sensitively changed up to the maximum value of 100%. If in such a case the center of gravity of the system would not be moved radially towards the second mass, but towards the fixed first mass, then the centrifugal force and therefore the conveying capacity would — when the prescribed minimum rotational speed is exceeded and the second mass moves away from the first mass — at first decrease to zero and would subsequently increase.

In comparison with a vibratory unit working with resonance a further advantage of the vibratory unit according to the invention resides in the fact that in the new device the centrifugal force does continuously decrease to a marked extent. As a result a stable synchronisation is also obtained in the lower region of the regulation range, if two contrarotating vibration-exciting units are arranged on the vibrating conveyer or screen.

The decrease of centrifugal forces in conformity with decreased motor speed brings the further considerable advantage that a larger speed range is available than is the case in devices working with constant centrifugal forces, for owing to the lower and steadily decreasing centrifugal forces in the lower speed range the resisting forces which are to be overcome also become correspondingly smaller, so that a smaller motor torque suffices for preventing the motor from stalling. In consequence thereof the prescribed lower speed can be selected lower than in devices operating with resonance.

A preferred embodiment of the invention will now be described with reference to the drawings. In the drawings FIG. 1 shows in section and in elevation seen in the direction of the motor shaft a pair of associated unbalance masses and the spring means interposed there between with the second mass being shown in its initial position;

FIG. 2 shows a similar view as FIG. 1 of the vibratory unit with the second mass in a position corresponding to a motor speed intermediate the minimum speed and the rated or maximum speed; and FIG. 3 is a semi-schematic representation of an asynchronous polyphase motor having a pair of associated unbalanced masses adjacent each end of the motor shaft and speed regulator for controlling the speed of the motor.

In the drawing, which show end views of the vibration exciting power unit seen in the direction of axis 1 of the motor shaft 2, only one end of shaft 2 is shown. Actually this shaft extends outwardly from both ends of the motor (not shown). The motor is a short circuit rotor motor. On each of the free ends of the motor shaft a pair of associated unbalanced masses resp. weight 3, 4 is supported. Of the pair of masses shown in the drawing the mass 3 referred to herein as the first mass is rigidly fastened to the motor shaft. In the embodiment shown mass 3 has a slot 7 extending radially outwardly from a bore 6. When mass 1 has been properly positioned by pulling it on the shaft its two portions separated by slot 7 are tightly drawn together by a screw 8 thereby firmly fastening mass 3 on the shaft. The other or second mass 4 is arranged in such a way that it is relatively movable to mass 3 resp. to axis 1 from its initially occupied position shown in FIG. 1 in the direction of arrow 9.

The regulation means designated "speed regulator" in FIG. 3 is a transformer with which the supply voltage of the motor is regulated. The regulation means is of known type and therefore details thereof need not be shown.

The spring means interposed between the two unbalanced masses comprises four prestressed helical compression springs 11 of which only two are shown in the drawing. The other two springs are disposed in back of the two springs shown. The center of gravity of the system comprising the masses 3, 4 and the springs 11 is, if the second mass is in its initial position, located on axis 1. This position of the center of gravity is obtained by balancing the system.

The system is so devised that the restoring force of the springs 11 which forces the two masses 3, 4 into mutual engagement is, owing to the selected prestressing of the springs, of such magnitude that at a motor speed n between zero and a predetermined minimum speed $n_{min}$ the second mass 4 is held in its initial position (FIG. 1), inasmuch as the centrifugal force acting on mass 4 does not suffice to overcome the restoring force. The predetermined motor speed $n_{min}$ corresponds to that motor speed at which the motor torque just suffices to overcome the forces resisting a rotation of the motor, for instance frictional resistance. If the speed is reduced below $n_{min}$ the motor will stall. The speed $n_{min}$ is also the lower speed limit of the regulation range. If by regulation or control the speed is increased to a value between $n_{min}$ and $n_N$ (rated speed), the centrifugal force acting on the second mass 4 is larger than the restoring force of the springs. The second mass 4 will therefore be lifted from the first mass 3 and will move radially outwardly in the direction of arrow 9 against the restoring force which is increased by such movement. The system is so devised that within the regulation range each specific speed is associated with a specific position of the second mass relative to the first mass. The defined outward movement of the second mass 4 at a specific speed within the regulation range is preferably obtained by making the total spring constant c of the spring means larger than the product of the mass $m$ of the second unbalanced mass and the square of the angular velocity $\omega_N$ corresponding to the rated speed $n_N$. Preferably the linear amount of prestressing of springs 11 is smaller than the distance a of the center of gravity $S_4$ of the second mass 4 as shown in FIG. 1, with said second mass in its initial position.

As guiding means for the second mass 4 there are provided four pins 12 which constitute the free ends of the shafts of bolts 13 threadedly connected to a flange 14 of first mass 3. These pins 12 extend into guiding bores 16 provided in the second mass. Of these bolts only two are shown, as the other two are disposed in the drawing in back of those shown. The heads of the bolts 13 serve as supporting or centering means for springs 11.

Between the first mass 3 and the second mass 4, which is configurated symmetrically with respect to the motor axis 1 and also with respect to the first mass, there is provided an elastic buffering layer 17 which is fixedly connected as by bonding to flange 14 at its side 19 facing the second mass. This buffering layer 17 which may consist for instance of polyethylene or a suitable rubber prevents chattering of the power unit.

A corresponding buffering layer 21 is also provided on the stop faces of stops 22, in order to prevent chattering, when the maximum speed resp. rated speed $n_N$ has been reached. The stops 22 are parts of bolts threadedly connected to mass 3. These bolts, which are adjustable by means of nuts 23, also serve for centering and supporting the springs 11. Although it would be possible to do without such stops, inasmuch as the largest outward movement of mass 4 is prescribed by the rated speed, the provision of such stops is preferred for reason of safety.

In the exceptional case that the available regulation range between maximum and practically zero is not to be fully utilized and that it is desired to regulate the conveying capacity only between a maximum value and a fraction of this maximum, for instance 70% of said maximum, then the mass system can be so devised that the center of gravity of the entire system is, when the device is in its position of rest shown in FIG. 1, not located on the motor axis, but is shifted outwardly in the direction of arrow 9 in accordance with the desired minimum conveying capacity in the lower region of the regulation range. Also in such a case the restoring force of the spring means is so selected that the second mass 4 moves away from the motor axis at the lower speed $n_{min}$. In the embodiment shown the short circuit rotor motor has a rated speed $n_N$ = 1470 revolutions/min, which owing to the decreasing centrifugal force at decreased motor speeds-contrary to known resonant unbalanced power units — cannot only be reduced to a value of $n_{min}$ = 1270 revolutions/min but, by lowering of the voltage, to a value for $n_{min}$ = 900 - 1000 revolutions/min. This results in a considerably larger regulation range and also in stable synchronised operation at any speed.

For putting the invention into practice normally available unbalanced exciting units can for instance be utilized by removing from their shaft ends the relatively rotatable unbalanced masses and replacing them by a pair of masses arranged in accordance with the invention. It is therefore possible to equip already operating vibratory units in a very simple manner with unbalanced masses of the new type.

In FIG. 2 the device of FIG. 1 is shown when operating at a motor speed between minimum speed $n_{min}$ and the maximum speed $n_{min}$. As described further above the second mass 4 has now moved away from the first mass 3 in the direction of arrow 9 with parts 13 and 21 being still out of engagement, as the rated speed $n_{min}$ has not been reached as yet. The axis of symmetry is indicated by the reference numeral 24.

I claim:

1. A vibratory power unit for use on AC current, in which the vibratory action may be controlled solely by adjustment of the applied AC voltage over a limited range, particularly for use as a power unit for vibrating conveyors, and screens, comprising an asynchronous polyphase motor having a useable speed range, in dependence upon applied voltage, of from normal design rated maximum speed at normal supply voltage to a minimum useable speed of approximately 80% thereof, at an intermediate reduced voltage, at least one centrifugal assembly, disposed on the shaft of said motor, comprising a pair of cooperable masses, the first mass of which is rigidly fastened to said shaft, and the other of which is mounted for radial movement outwardly from an inner operative position, at which the assembly has a minimum unbalance, to an outer operative position of maximum unbalance, at which maximum vibratory action is produced, and spring means biasing said second mass in a direction toward said inner position, said spring means having such physical and operating parameters, and being so prestressed that the pressure applied to said second mass is greater than centrifugal forces on said mass opposing said spring pressure, at motor speeds below said minimum useable speed, and thus operative to maintain said mass in its inner position until such minimum speed is exceeded, but is insufficient to restrict outward movement of said mass to said outer operative position at maximum motor speed, whereby as the motor speed is progressively increased from said minimum to said maximum said second mass will progressively move outward in respective relative positions in correspondence to the instant motor speed, whereby the vibratory forces producible by said mass may be progressively increased from an operative minimum condition to an operative maximum condition, merely by adjustment of the motor supply voltage within said relatively limited range varying the rotational motor speed from said minimum value to said maximum value, operative to provide a control of such conveyor or screen operation over the normal operational range of the latter.

2. Vibratory power unit according to claim 1, wherein the center of gravity of the system comprising said first second unbalanced masses and said spring means is disposed, when said second mass is in its initial position, at the rotational axis of said motor shaft and on the axis of symmetry of said masses.

3. Vibratory power unit according to claim 1, wherein the difference length of the spring means in its normal and its prestressed state is greater than the distance between the axis of said motor shaft and the center of gravity of said second mass, when said mass is disposed in its initial position.

4. Vibratory power unit according to claim 1, wherein the spring constant of said spring means is unequal to the product of the mass of said second unbalanced mass and the square of the angular velocity corresponding to the rated rotational speed of said motor.

5. Vibratory power unit according to claim 1, wherein stop means are provided between said masses for limiting relative movement of the masses away from each other when said motor rotates at its rated rotational speed.

6. Vibratory power unit according to claim 5, wherein means for supporting the free ends of said spring means are so configurated that they also act as stop means.

7. Vibratory power unit according to claim 6, wherein at least one of the abutting faces of said stop means is covered by a layer of resilient material.

* * * * *